United States Patent
Hall et al.

(10) Patent No.: US 10,920,299 B2
(45) Date of Patent: Feb. 16, 2021

(54) SYSTEM OPTIMIZATION USING COMPRESSED RETICULATED FOAM STRUCTURES

(71) Applicant: ERG AEROSPACE CORPORATION, Oakland, CA (US)

(72) Inventors: Mitchell Hall, Oakland, CA (US); Denver Schaffarzick, Pacifica, CA (US); Mark Benson, Monterey, CA (US)

(73) Assignee: ERG AEROSPACE CORPORATION, Oakland, CA (US)

( * ) Notice: Subject to any disclaimer, the term of this patent is extended or adjusted under 35 U.S.C. 154(b) by 0 days.

(21) Appl. No.: 16/679,166

(22) Filed: Nov. 9, 2019

(65) Prior Publication Data

US 2020/0071795 A1 Mar. 5, 2020

Related U.S. Application Data

(63) Continuation of application No. PCT/US2018/032468, filed on May 11, 2018.

(60) Provisional application No. 62/504,946, filed on May 11, 2017.

(51) Int. Cl.
*C22C 1/08* (2006.01)
*B33Y 70/00* (2020.01)

(52) U.S. Cl.
CPC ............ *C22C 1/08* (2013.01); *B33Y 70/00* (2014.12)

(58) Field of Classification Search
CPC ............... B22F 2999/00; B22F 2207/17; B22F 3/1146; B22F 3/168; C22C 1/08
USPC ................................................. 75/415
See application file for complete search history.

(56) References Cited

U.S. PATENT DOCUMENTS

| | | | |
|---|---|---|---|
| 3,616,841 A | 11/1971 | Walz | |
| 5,588,477 A | 12/1996 | Sokol et al. | |
| 5,679,041 A | 10/1997 | Sokol et al. | |
| 6,432,379 B1 | 8/2002 | Heung | |
| 6,929,866 B1 | 8/2005 | Williams et al. | |
| 7,718,246 B2 | 5/2010 | Strauss | |
| 2009/0214819 A1* | 8/2009 | Tomita | C04B 35/478 428/116 |
| 2013/0325142 A1 | 12/2013 | Hunter et al. | |
| 2014/0044951 A1 | 2/2014 | Beals et al. | |
| 2017/0160063 A1* | 6/2017 | Meeks | F42B 12/22 |

* cited by examiner

*Primary Examiner* — Jie Yang
(74) *Attorney, Agent, or Firm* — Gorman IP Law, APC

(57) ABSTRACT

Heterogeneously dense (relative density) continuous one-piece insoluble reticulated foam material with a continuous relative density gradient and/or distinct and marked relative densities and methods of manufacture.

12 Claims, 4 Drawing Sheets

| Strain (in/in) | Stress (PSI) | | | |
| --- | --- | --- | --- | --- |
| | 10% Density | 25% Density | 35% Density | 40% Density |
| 0 | 20 | 20 | 20 | 20 |
| 0.01 | 76 | 77.6 | 92 | 104 |
| 0.02 | 142.4 | 163.2 | 440 | 512 |
| 0.03 | 177.6 | 237.6 | 768 | 1184 |
| 0.04 | 193.6 | 304.8 | 1032 | 1848 |
| 0.05 | 201.6 | 368 | 1228 | 2360 |
| 0.06 | 208 | 424.8 | 1328 | 2680 |
| 0.07 | 212 | 469.6 | 1404 | 2876 |
| 0.08 | 214.4 | 500.8 | 1468 | 3024 |
| 0.09 | 217.6 | 528 | 1524 | 3144 |
| 0.1 | 222.4 | 552.8 | 1568 | 3256 |
| 0.15 | 238.4 | 656 | 1824 | 3824 |
| 0.2 | 252.8 | 754.4 | | |
| 0.25 | 267.2 | 896 | | |
| 0.3 | 282.4 | 1072 | | |
| 0.35 | 309.6 | 1284 | | |
| 0.4 | 346.4 | 1560 | | |
| 0.45 | 396 | 1924 | | |
| 0.5 | 464.8 | | | |

SYSTEM OPTIMIZATION USING COMPRESSED RETICULATED FOAM STRUCTURES

This application is a Continuation application of PCT International Application No. PCT/US2018/032,468 filed on May 11, 2018, which claims priority under 35 U.S.C. § 119 on Patent Application No. 62/504,946 filed in the United States on May 11, 2017, the entire contents of each of which are hereby incorporated by reference.

TECHNICAL FIELD

Embodiments of the present invention relate to the technical field of reticulated foam structures. More particularly, the embodiments of the present invention are directed toward heterogeneous reticulated foam structures.

BACKGROUND OF THE INVENTION

DUOCEL® foam is a material manufactured by ERG Aerospace Corporation (www.ergaerospace.com). The material has been manufactured, engineered to meet end user applications, and sold by ERG Aerospace Corporation since 1967. The original manufacturing patent for DUOCEL® is listed as U.S. Pat. No. 3,616,841 and advances in manufacturing methods have progressed the use of DUOCEL® as a material solution for a broad number of applications.

DUOCEL® is an open celled foam structure that takes on the characteristics of a base organic alloy. These base alloys typically consist of low temperature alloys such as aluminum, copper, zinc, and other refractory metals. The advantages of an open celled foam structure is that the material offers high surface areas and outstanding strength to weight ratios. Unlike closed cell foams, gases, liquids, and other mediums may pass through the pores of the material. This enables the material to be used in applications such as heat exchangers, energy absorbers, baffles, structural support members, and other applications that take advantage of the homogeneous open celled framework of the material.

DUOCEL® is manufactured in a range of pore sizes. These sizes include 5 pores per inch (PPI), 10 PPI, 30 PPI, and 40 PPI. The advantage of having different pore sizes is that the material may be optimized for different applications. As an example, if high pressure gas diffusion is a primary requirement of an end user, then the 40 PPI material can be chosen to provide adequate pressure drop given the higher surface area. Conversely, a 5 PPI material may provide less pressure drop but the material may weigh less. Therefore, there is a weight and performance consideration for the specific PPI chosen. Specific examples of where this applies is with the design of filtration systems where flow rates and pressure drops are primary input parameters for optimizing the performance of a pump. Other applications include heat exchangers, energy absorbers, and other mechanical systems where there may exist a unique and single optimized system solution.

It is also possible to control the relative density of DUOCEL® for each of the pore sizes referred to above. In other words, it is possible to add material to the individual ligaments of DUOCEL® to create relative density ranges. As an example, a 5 PPI piece of DUOCEL® may be modified at the individual ligament level to achieve relative density ranges anywhere from 3 to 20 percent relative density (relative to the weight of the solid alloy). The relative density, much like the PPI, may be modified as a design parameter to meet end user requirements. A DUOCEL® part or insert that maintains the same porosity and relative density is considered homogeneous.

Another unique feature of DUOCEL® is that the material is composed of interconnected solid ligament structures or cells. Conversely, open celled foam materials that are manufactured using a chemical vapor deposition (CVD) type processes utilize a host structure as a base for additive materials. These host structures are typically plastic or other materials that do not mirror the same composition as the CVD additive. The result is that CVD type manufactured foams are considered hollow and result in lower yield stresses (or lower foam modulus). In other words, the individual ligaments lack a homogeneous make up and fail when loading the material at lower thresholds then DUOCEL®. This material disadvantage reduces the yield stress of parts manufactured utilizing the CVD technique, reduces thermodynamic properties of the material, creates non-homogeneous boundary layers between the CVD layers, and limits the design power of using CVD parts for unique engineering solutions when compared to DUOCEL®.

Other additive manufacturing processes, to include 3-D printing, are also at a disadvantage when compared to the versatility of DUOCEL®. As mentioned above, inconsistent temperature profiles during the additive manufacturing process create degraded boundary layer affects when compared to DUOCEL®. Most 3-D printing techniques also create slip planes in between layers. These factors cause additive manufacturing processes to be weaker (have a lower yield stress) and limits their energy absorption capabilities and pressure drop design capability.

One advantage that 3-D printing has over DUOCEL® is that the porosity and relative density of a supporting matrix may be varied across the entire part, validated, and then printed during the build process. Currently, 3-D printers are unable to print the complex geometries that DUOCEL® provides.

In addition, open celled foam structures that are manufactured using additive processes, to include CVD and 3-D printing, often fail when compressed due to the lower yield stress (foam modulus) and are therefore limited to being densified to ranges below 30% relative density. The limit in the ability to compress these types of materials reduces their ability to meet unique design solutions.

BRIEF SUMMARY OF THE INVENTION

Therefore, there is a need to create heterogeneous relative density open celled DUOCEL® structures or inserts from an original homogeneous relative density part in order to provide optimized system performance. Doing so would enable DUOCEL® the ability to directly compete with 3-D printed structures where relative density and porosity may be modified across an entire part.

Furthermore, there is a need to create customized DUOCEL® parts where relative density ranges anywhere from 3-85% for a single part in order to provide engineers with versatile system solutions. These relative density ranges may be created by densifying the material along a single direction (along the x-axis), across two directions (along the x-y axes), or across the material in three dimensions (along the x-y-z axes).

It is a further objective of the present invention to create heterogeneous DUOCEL® structures where the relative density range differs throughout the structure when densified. These types of structures offer a versatile material solution where each zone of DUOCEL® is densified to meet any number of system requirements within a zone or presents a progressive range of relative densities across the structure.

It is yet a further objective of the present invention to introduce methods of manufacturing that creates heterogeneous foam structures and densified foam structures utilizing presses and dies. These types of manufacturing procedures are inexpensive and tight tolerances can be held. Reduced setup time for the dies and presses, the simplicity of a hydraulic press when compared to tooling machines, and overall throughput makes this approach inexpensive and more efficient when compared to CNC machinery or 3-D printing.

It is a further objective of the present invention to use heterogeneous DUOCEL® parts or inserts as energy absorbers, filters, heat exchangers or other applications where system performance may be optimized through heterogeneous relative densification.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE ILLUSTRATED EMBODIMENTS

Figure 1:
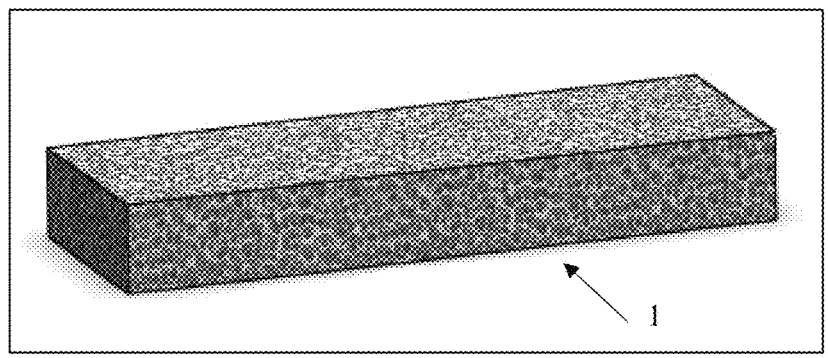
FIG. 1 is a perspective view of a homogeneous relative density continuous one-piece insoluble reticulated open celled foam material (1).

The present invention will now be described in detail with reference to the accompanying drawings, wherein the same reference numerals will be used to identify the same or similar elements throughout the several views. It should be noted that the drawings should be viewed in the direction of orientation of the reference numerals.

FIG. 1 illustrates a homogeneous relative density continuous one-piece insoluble reticulated open celled foam material (1). The part has a relative density of 10%.

Figure 2:
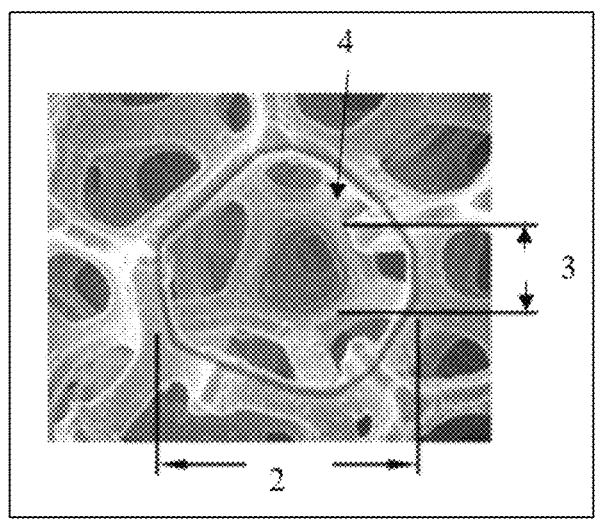
FIG. 2 is a perspective view of a single cell (2) of a homogeneous relative density continuous one-piece insoluble reticulated open celled foam material (1).

FIG. 2 illustrates a single cell (2) of a homogeneous continues one-piece insoluble reticulated open celled foam material (1) where each cell (2) is generally characterized as a bubble shaped 14 sided polyhedral or solid shape tetrakaidekahedron. Within each cell (2) is a series of pores (3) that create the open celled architecture and each pore (3) is defined by a number of solid ligaments (4). These ligaments (4) take on the properties of the base alloy and examples include aluminum, titanium, copper, and other metals. Typically, the ligament width is 0.025 mm to 0.65 mm, such as 0.028 mm to 2.8 mm, 0.05 mm to 2.8 mm, 0.05 mm to 0.5 mm, 0.05 to 0.65 mm, 0.1 mm to 0.5 mm, 0.1 mm to 0.7 mm, or any range of values falling between 0.025 mm and 0.7 mm. For example, a 10 PPI material can have a mean value ligament thickness of 0.41 mm or a 20 PPI material can have a mean value ligament thickness of 0.31 mm, while a 40 PPI material can have a mean value ligament thickness of 0.18 mm.

Ligament (4) thickness differs based on the density of the homogeneous continuous one-piece insoluble reticulated open celled foam material (1). As shown in FIG. 2, a 10% relative dense ligament that consists of 10 pores (3) per inch (approximated) has a mean value thickness diameter or width of approximately 0.041 mm. This creates an average cell (2) diameter for the material shown to be approximately 2.2 mm.

Figure 3:
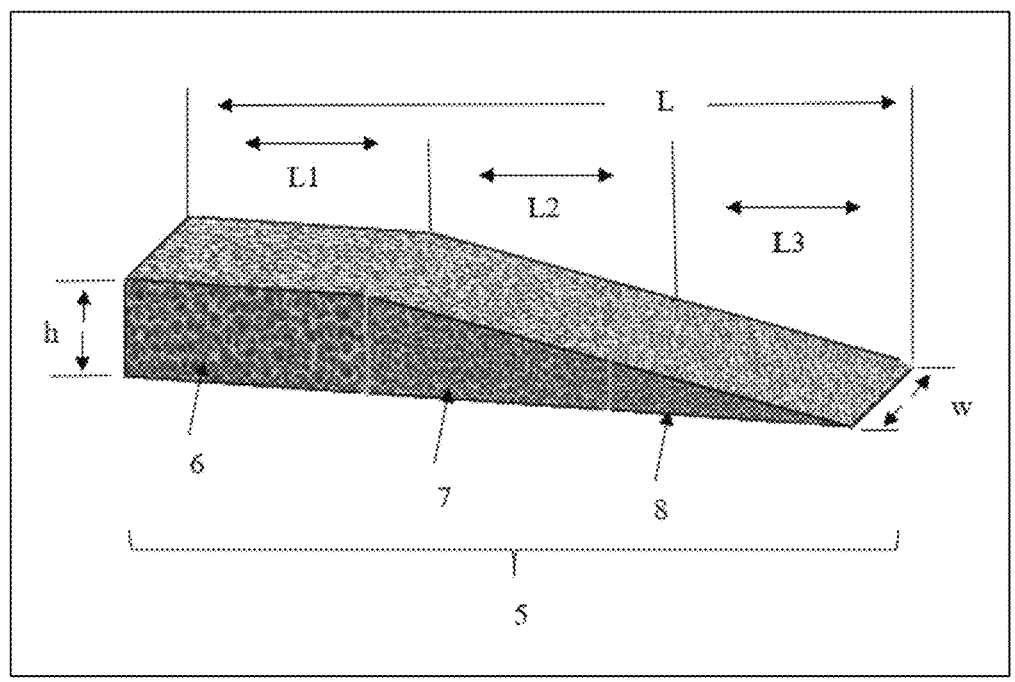
FIG. 3 is a perspective view of a heterogeneous relative density continuous one-piece insoluble reticulated open celled foam material (5).

FIG. 3 illustrates a single heterogeneously dense (relative density) continuous one-piece insoluble reticulated foam material (5) that has been fabricated from a homogeneous relative density continuous one-piece insoluble reticulated open celled foam material (1). The part has an overall width w, height h, and length L and, in this example, the density varies along the length L of the part. In fact, average relative densities vary across and along three different sections of the part. Section one (6) of the part remains at 10 pores (3) per inch, 10% relative density, and remains unchanged along the length L1. Section two (7) of the part remains at 10 pores (3) per inch but the relative density over the length L2 has increased to an average of 25% where cell size diameter is approximately 1.2 mm. Likewise, section three (8) has increased relative density to an average of 35% along length L3 and a cell size diameter of approximately 0.8 mm.

Typically, average cell diameters in heterogenous relative density continuous one-piece insoluble reticulated foam material (5) range from about 0.35 mm to about 4 mm, such as 0.8 mm to 0.38 mm. If the densification process is continuously gradual across the heterogenous relative density continuous one-piece insoluble reticulated foam material (5), then all intervening fractions between the relative density of the least dense portion and the relative density of the most dense portion are represented. If, however, a part made from the particular heterogenous relative density continuous one-piece insoluble reticulated foam material (5) is desired to have a number of set relative densities that occur within the part in some type of a step-wise manner, then the average cell diameters associated with only those relative densities will be present. For example, if the part requires a portion with a relative density of 10%, that is adjacent to a portion with a relative density of 33%, that is adjacent to a portion with a relative density of 25%, then the average cell size diameters present in the part will be about 2.8 mm (10% relative density), 0.8 mm (33% relative density), and 1.2 mm (25% relative density).

Figures 4, 5A:
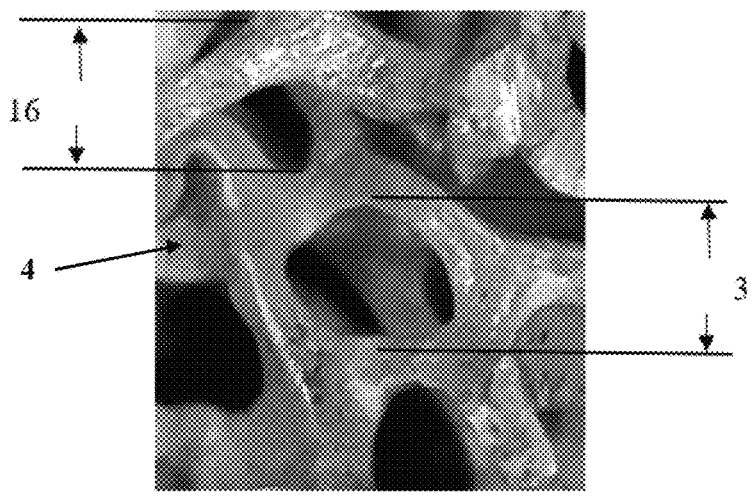
FIG. 4 is a perspective view of a single cell (2) of a heterogeneous relative density continuous one-piece insoluble reticulated open celled foam material (5) after densification.
FIG. 5A is a table that provides data points from stress-strain relationships from densification of a heterogeneous relative density continuous one-piece insoluble reticulated open celled foam material (5).

FIG. 4 illustrates the changes of the ligament (4) after densification reaching the 35% relative density of section three (8). While the ligament (4) is shown to have buckled, the overall structural integrity of the deformed pores (16) remains intact and therefore provides strength to the heterogeneously dense (relative density) continuous one-piece insoluble reticulated foam material (5). Likewise, the collapsing of the cell (2) volume provides increased fluid impedance when compared to the original relative density. The changes made therefore afford one to modify the stress strain performance characteristics and the impedance ability of the foam to enhance system optimization.

Laboratory experimentation has confirmed stress-strain relationships of the single heterogeneously dense (relative density) continuous one-piece insoluble reticulated foam material (5) for each of the sections (6-8) illustrated as a demonstration. More specifically, experimentation was conducted and load vs. deflection readings were obtained in the following manner: During the first 100 mils of deflection, readings were taken at intervals of 10 mils; thereafter, readings were recorded every 50 mils until either a deflection of 500 mils was reached, or 150 mils with a load in excess of 1000 pounds was reached, or 150 mils with a load in excess of 10000 pounds was reached, or 10000 pounds was reached after 150 mils, but before 500 mils. Data points collected are presented in FIG. 5A.

Figure 5B:
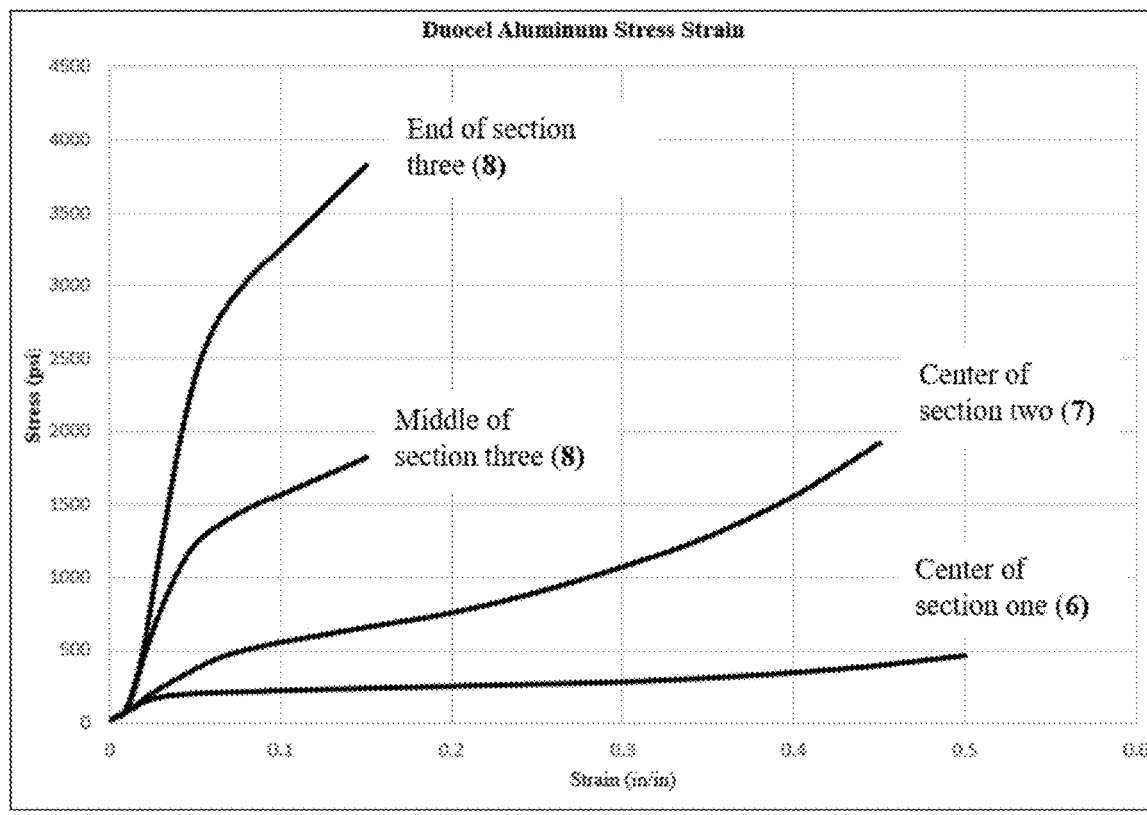
FIG. 5B is a stress strain curve that demonstrates the different relative density properties of a single heterogeneous relative density continuous one-piece insoluble reticulated open celled foam material (5) when assessed for different sections of the material (L1-L3).

FIG. 5B shows the stress-strain curves associated with each section (6-8) of the single heterogeneously dense (relative density) continuous one-piece insoluble reticulated foam material (5). This loading distribution across the entire length L of the single heterogeneously dense (relative density) continuous one-piece insoluble reticulated foam material (5) is done to demonstrate how a single part can meet versatile design requirements where complex and different energy absorbing properties throughout the length L might be required.

Figure 6A:
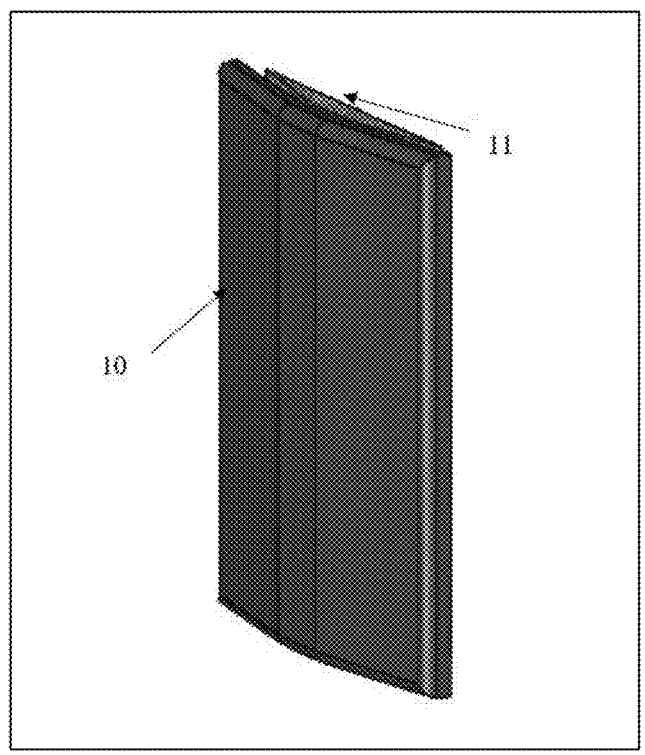
FIG. 6A is a perspective view of an application where a single heterogeneous relative density continuous one-piece insoluble reticulated open celled foam material (5) is used to demonstrate energy absorption system optimization.
Figure 6B:
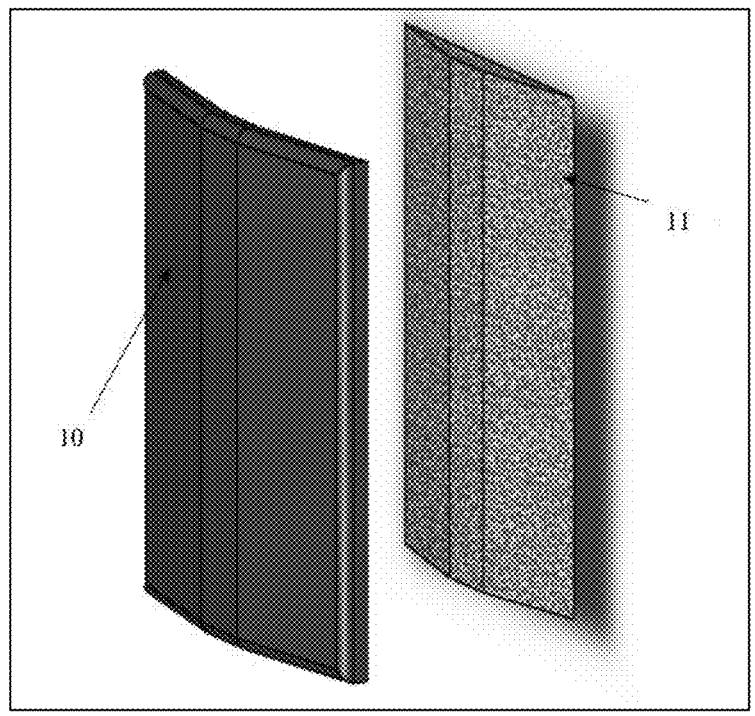
FIG. 6B is a perspective view of the same system above.

One example of the value of a single heterogeneously dense (relative density) continuous one-piece insoluble reticulated foam material (5) is the design and fabrication of a blunt trauma foam protection barrier (11) as shown in FIG. 6. While body armor (10) provides protection for soldiers and first responders against bullets, the protective plate characteristically used in such devices cannot alone reduce backside spalling that occurs when a bullet strikes the protective plate. In other words, people who are shot when wearing body armor typically experience blunt trauma due to the backside effects of the protective plate.

Utilizing a single heterogeneously dense (relative density) continuous one-piece insoluble reticulated foam material (5) within a body armor (10) system, one may reduce the energy translated from the body armor (10) to the individual. Furthermore, by changing the relative density of that additional foam protection barrier (11), vital organs (such as the heart that which is centered near the middle of the chest) are protected with a thicker foam protection barrier (11) where needed most. Likewise, the thinner foam located at the edges of the protection barrier (11) within the body armor (10) provides ample protection but also allows the individual to be unencumbered in movement due to the low volume of the device.

Figure 7:
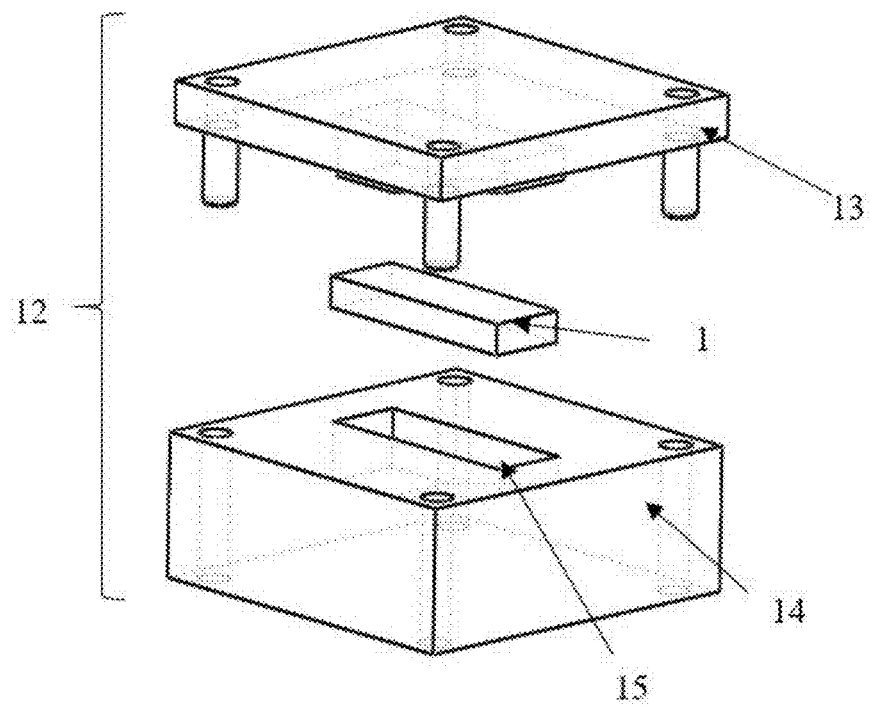
FIG. 7 is a perspective view of an example of a die set for manufacturing heterogeneous relative density continuous one-piece insoluble reticulated open celled foam material.

FIG. 7 illustrates an example of a die set (12) that manufactures the foam protective barrier (11) mentioned above. The die set (12) consists of a male press (13), a female press (14), and a place to insert a homogeneous (relative density) continuous one-piece insoluble reticulated open celled foam material (1) in order to transform it into a single heterogeneously dense (relative density) continuous one-piece insoluble reticulated foam material (5). To accomplish this, a series of manufacturing steps must be implemented.

First, the homogeneous relative density continuous one-piece insoluble reticulated open celled foam material (1) must be structurally weakened through a heating process if the parts measure thicker than 6 mm. Typically, homogeneous relative density continuous one-piece insoluble reticulated open celled foam material (1) that is equal to or greater than 6 mm thick is heated to 20-200° C. Heating and weakening the structure may not be needed for parts less than 6 mm thick because small parts tend to have few cells (2) and thereby have adequate space to densify without interference. In other words, a thin 10 pores (4) per inch part with an original 10% relative density is limited in its ability to reach high relative densities simply because the lack of material present prevents it. As an example, a thin part might only be able to reach a maximum density of only 20 to 25% relative density.

For larger parts, a heating process, heat treatment, or annealing process is undertaken to change the material properties of the host alloy, as mentioned above. Ideally, this process softens the material and enables it to become less brittle and more ductile thereby ensuring uniform ligament (4) buckling during densification. After the densification process, strength is returned to the product by subjecting the heterogeneously densified (relative density) foam material (5) to a heat treatment according to ASTM International standards appropriate for the metal or alloy used in the homogeneous relative density continuous one-piece insoluble reticulated open celled foam material (1).

Once the material has been modified, the press and die procedure may begin. This is initiated by first placing the homogeneous relative density continuous one-piece insoluble reticulated open celled foam material (1) within a female die set. Once in position, a male die set is placed on top of the part and pressing is slowly initiated. This rate is typically no faster than 100 mils/second. The amount of pressure will vary depending upon the thickness of the homogeneous relative density continuous one-piece insoluble reticulated open celled foam material (1) used and/or the PPI of that material. Pressures range from 1,000 psi to 40,000 psi, such as 5,000 psi to 20,000 psi, but can include any range of pressures falling within 1,000-40,000 psi.

It should also be noted that this process must be done in stages when achieving higher relative density levels is desired. More specifically, when parts are pressed and the densities approach 20% relative density, the parts are removed, cleaned, and then loaded into secondary presses and dies which further densify the material as needed. This treatment with secondary presses addresses the spring-back memory action of the material and provides a more uniform overall compression.

In addition to a stepped press approach, it should also be noted that the material may only be compressed up to levels of 70% relative density when heating in the 20-200° C. range. Further densification is possible, but temperatures within the part must be nearing the molten state of the base alloy to reach relative densification levels of more than 70%, such as 72.5%, 75%, 77.5%, 80%, 82.5%, 85%, 87.5% or more.

What is claimed is:

1. A method of producing a heterogeneously dense continuous one-piece insoluble reticulated open celled foam metal or alloy material from a homogenously dense one-piece insoluble reticulated open celled foam metal or alloy material comprising
   (a) obtaining a homogenously dense one-piece insoluble reticulated open celled from metal or allow material;
   (b) placing a single piece of the homogenously dense insoluble reticulated open celled foam metal or alloy material in a press and die; and
   (c) applying different amounts of pressure to the press ranging from 1,000 psi to 40,000 psi to create a heterogenous density within the single piece of reticulated open called foam metal or alloy material, wherein the heterogenous density results from the collapsing of the open cells
  to generate a heterogeneously dense continuos one-piece insoluble reticulated open celled foam metal or alloy material comprising
     (1) open cells ranging in size and having a maximum diameter of 4 mm and a minimum diameter of 0.35 mm;
     (2) ligaments having a width of 0.025 mm to 0.7 mm;
     (3) pores formed by the ligaments; and
     (4) a density within the heterogeneously dense one-piece insoluble reticulated open celled foam metal or alloy material ranging from an increase of at least 3% in density at a least dense point to an increase of 85% density at a most dense point as compared to the density of the homogenously dense one-piece insoluble reticulated open celled foam metal or alloy material,
    wherein the density is a continuous gradient across the heterogeneously dense one-piece insoluble reticulated open celled foam metal or alloy material.

2. The method according to claim 1, wherein the press or die is heated up to 200° C.

3. The method according to claim 1, wherein the amount of pressure is 5,000-20,000 psi.

4. The method according to claim 1, wherein the pressure is applied at a rate of 1-100 mil/sec to produce a continuous heterogenous density gradient.

5. The method according to claim 1, wherein the pressure is applied to produce a heterogenous density that has distinct and marked differences.

6. A method of producing a heterogeneously dense continuous one-piece insoluble reticulated open celled foam metal or alloy material from a homogenously dense one-piece insoluble reticulated open celled metal or alloy foam material comprising
   (a) obtaining a homogenously dense one-piece insoluble reticulated open celled foam metal or alloy material;
   (b) heating a single piece of homogenously dense insoluble reticulated open celled foam metal or alloy material equal to or greater than 6 mm thick to up to 200° C. prior to placing the homogenously dense insoluble reticulated open celled foam metal or alloy material in a press and die; and
   (c) applying different amounts of pressure to the press ranging from 1,000 psi to 40,000 psi to create a heterogenous density within the single piece of reticulated open celled foam metal or alloy material, wherein the heterogenous density results from the collapsing of the open cells
  to generate a heterogeneously dense continuous one-piece insoluble reticulated open celled foam metal or alloy material comprising
     (1) open cells ranging in size and having a maximum diameter of 4 mm and a minimum diameter of 0.35 mm;
     (2) ligaments having a width of 0.025 mm to 0.7 mm;
     (3) pores formed by the ligaments; and
     (4) a density within the heterogeneously dense continuous one-piece insoluble reticulated open celled foam metal or alloy material ranging from an increase of at least 3% dense at a least dense point to 85% dense at a most dense point as compared to the density of the homogenously dense one-piece insoluble reticulated open celled foam metal or alloy material,
    wherein the density is a continuous gradient across the heterogeneously dense one-piece insoluble reticulated open celled foam metal or alloy material.

7. The method according to claim 6, wherein the homogenously dense insoluble reticulated open celled foam metal or alloy material is heated to 100-200° C. prior to placing in the press or die.

8. The method according to claim 6, wherein the amount of pressure is 5,000-20,000 psi.

9. The method according to claim 6, wherein the pressure is applied at a rate of 1-100 mil/sec to produce a continuous heterogeneous density gradient.

10. The method according to claim 6, wherein the press or die is heated to 20-200° C.

11. A method of producing a heterogeneously dense continuous one-piece insoluble reticulated open celled foam material from a homogenously dense one-piece insoluble reticulated open celled foam material comprising
   (a) obtaining a homogenously dense one-piece insoluble reticulated open celled foam material consisting of metal or alloy;
   (b) placing a single piece of the homogenously dense insoluble reticulated open celled foam material in a press and die; and
   (c) applying different amounts of pressure to the press ranging from 1,000 psi to 40,000 psi to create a heterogenous density within the single piece of reticulated open celled foam material, wherein the heterogenous density results from the collapsing of the open cells
  to generate a heterogeneously dense continuous one-piece insoluble reticulated open celled foam material comprising
     (1) cells ranging in size and having a maximum diameter of 4 mm and a minimum diameter of 0.35 mm;
     (2) ligaments having a width of 0.025 mm to 0.7 mm;
     (3) pores formed by the ligaments; and
     (4) a density within the heterogeneously dense one-piece insoluble reticulated open celled foam material ranging from an increase of at least 3% in density at a least dense point to an increase of 85% density at a most dense point as compared to the density of the homogenously dense one-piece insoluble reticulated open celled foam material,
    wherein the density is a continuous gradient across the heterogeneously dense one-piece insoluble reticulated open celled foam metal or alloy material.

12. A method of producing a heterogeneously dense continuous one-piece insoluble reticulated open celled foam material from a homogenously dense one-piece insoluble reticulated foam material comprising (a) obtaining a homogenously dense one-piece insoluble reticulated open celled foam material consisting of metal or alloy;
(b) heating a single piece of homogenously dense insoluble reticulated open celled foam material equal to or greater than 6 mm thick to 20-200° C. prior to placing the homogenously dense insoluble reticulated open celled foam material in a press and die; and
(c) applying different amounts of pressure to the press ranging from 1,000 psi to 40,000 psi to create a heterogenous density within the single piece of reticulated open celled foam material wherein the heterogenous density results from the collapsing of the open cells to generate a heterogeneously dense continuous one-piece insoluble reticulated open celled foam material comprising
(1) cells ranging in size and having a maximum diameter of 4 mm and a minimum diameter of 0.35 mm;
(2) ligaments having a width of 0.025 mm to 0.7 mm;
(3) pores formed by the ligaments; and
(4) a density within the heterogeneously dense continuous one-piece insoluble reticulated open celled foam material ranging from an increase of at least 3% dense at a least dense point to 85% dense at a most dense point as compared to the density of the homogenously dense one-piece insoluble reticulated open celled foam material,
wherein the density is a continuous gradient across the heterogeneously dense one-piece insoluble reticulated open celled foam material.

\* \* \* \* \*